SEQUENCE CONTROL CIRCUIT
Filed Dec. 4, 1963
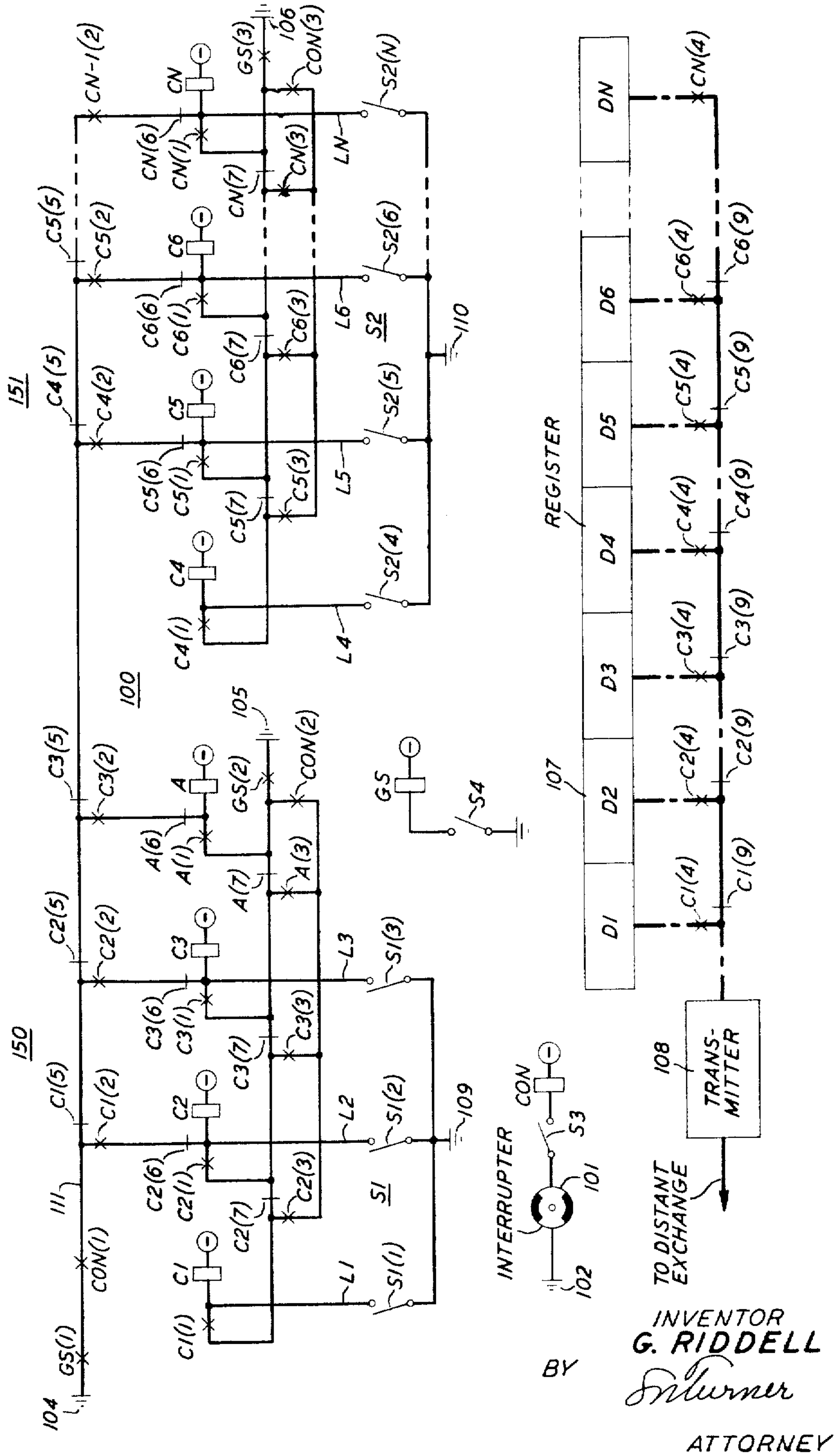
INVENTOR
G. RIDDELL
BY
[signature]
ATTORNEY United States Patent Office 3,290,657

Patented Dec. 6, 1966

3,290,657

SEQUENCE CONTROL CIRCUIT

George Riddell, Lincroft, N.J., assignor to Bell Telephone Laboratories, Incorporated, New York, N.Y., a corporation of New York Filed Dec. 4, 1963, Ser. No. 327,979
10 Claims. (Cl. 340—172.5)

My invention relates generally to sequence circuits, more particularly to sequence circuits which respond to a series of control signals, and specifically to sequence circuits capable of performing a sequence of control functions in response to a series of control signals.

My invention may be used, as disclosed herein by way of example, sequentially to retrieve information stored in a storage circuit and more particularly to retrieve in sequence selected bits of the data stored in a plurality of registers in response to a series of control signals. Sequence circuits, often called steering circuits, have been used for many years in telephone system sender circuits to provide sequential access to bits of stored call information. Digital data which identifies a called telephone station is stored in a sender circuit. The digits of the stored data are then sequentially encoded and transmitted by the sender circuit to a distant telephone exchange. Access sequence circuitry is included in the sender circuit between the call information storage circuit and the signal transmitting circuit of the sender. The respective digits of the stored call information are sequentially supplied through the sequence circuitry to the signal transmitting circuit for conversion into appropriately coded signals. The coded signals are then transmitted to a distant telephone exchange, which utilizes the call information represented by the coded signals to complete a call connection to the called telephone station.

In some instances it is advantageous to delete certain digits of the stored call information from the call information that is transmitted to the distant telephone exchange. For example, certain of the stored digits may represent call information which is not required by the distant telephone exchange to complete the desired call connection. In this event, the deletion of unnecessary digits from stored call information advantageously will reduce the holding time of high-usage sender and register equipment which otherwise would be unavailable to other calls over an unnecessarily extended period of time.

Prior art steering circuits provide for the selective deletion of any number of the initial digits of stored call information. This is accomplished by initially operating the steering device associated with the first non-deleted digit; all preceding digits of the stored information thereby being deleted since access thereto is denied. Due to the configuration of prior art steering circuits, only one steering device initially can be operated and held operated. Deletion of intermediate digits of the stored call information is accomplished by additional devices which, when operated, cause the steering circuit to bypass those steering devices which are associated with the unwanted digits. Access to the unwanted digits is thereby denied. A separate delete device is required for each combination of intermediate digits which can be deleted. An example of a prior art steering circuit similar to that described above is disclosed in B. McKim et al. Patent 2,564,441, which issued on August 14, 1951.

It is an object of my invention to simplify sequence circuits while retaining therein the requisite flexibility of control.

It is another object of my invention to modify prior art sequence circuitry so as to permit greater flexibility of control.

A further object of my invention is the improvement of sequence circuits having particular utility in information retrieval systems.

A more specific object of my invention is to reduce the control circuitry of sequence circuits and to incorporate therein the flexibility of selective control.

A further specific object of my invention is to improve the control circuitry of an information retrieval sequence circuit for selectively denying and allowing sequential retrieval of stored information.

Another specific object of my invention is to simplify and reduce the sequence circuit control circuitry required in an informational retrieval system to deny and allow sequential retrieval of selected initial and intermediate bits of stored information.

Still another specific object of my invention is selectively to bypass both initial and intermediate sequence devices of a sequence circuit by means of simplified and reduced sequence circuit control circuitry.

The aforegoing and other objects of my invention are accomplished in one illustrative embodiment thereof comprising a sequence circuit of steering relays which are sequentially operated in response to a pulse train of control signals. Access to each digit of information stored in a plurality of registers is provided through a gate comprising a make contact of the steering relay discretely associated with that information digit.

A make contact of a relay is one which is closed when the relay is operated and which is open when the relay is released. A break contact of a relay is one which is open when the relay is operated and which is closed when the relay is released.

The steering relays are divided into two groups. A holding circuit is provided for each steering relay in the first relay group which includes break contacts of all succeeding steering relays of the first relay group. A similar but separate holding circuit is provided for each steering relay in the second relay group which includes break contacts of all succeeding steering relays of the second relay group.

In accordance with an aspect of my invention, the aforedescribed holding circuit arrangement permits the selective initial operating and holding of one first group steering relay and one second group steering relay. Those first group steering relays which succeed the initially operated first group steering relay are sequentially operated in response to the initial control signals of the pulse train; thereby providing sequential access to the bits of stored information discretely associated therewith. Since those first group steering relays which precede the initially operated first group steering relay are not operated, access is denied to those bits of stored information which are associated therewith.

In accordance with another aspect of my invention, an auxiliary relay, which has no bit of stored information associated therewith, is included in the first relay group. The auxiliary relay responds to the particular control signal in the pulse train immediately succeeding the control signal which operated the last steering relay of the first relay group. The auxiliary relay absorbs this particular control signal, thereby compensating for the previous initial operation of a second steering relay in the sequence circuit.

A make contact of the initially operated, second group steering relay provides access to its associated bit of stored information following the operation of the auxiliary relay. Those second group steering relays which succeed the initially operated second group steering relay are then sequentially operated in response to further control signals of the pulse train; thereby providing sequential access to the bits of stored information discretely associated therewith. Since those second group steering relays which precede the initially operated second group steering relay are not operated, access is denied to the bits of stored information associated therewith.

Similar sequential arrangements utilizing selectively energizable sequence control devices other than relays may be devised in accordance with my principles of selective control exemplified above. In such arrangements, energized sequence control devices correspond to the operated relays of my exemplary description.

A feature of my invention is a sequence circuit control arrangement for initially energizing and holding energized a plurality of sequence control devices in a pulse train responsive sequence circuit.

Another feature of my invention is a separate holding circuit for each of a plurality of groups of sequence control devices, all of which are arranged in a sequence circuit having a common energizing circuit for applying a series of energizing pulses to the sequence control devices in a predetermined sequence.

A further feature of my invention is a pulse absorbing device included in each group of sequence control devices, save the last, for absorbing a selected control pulse of the series and thereby compensating for the initial energizing of a sequence control device in the next group of sequence control devices.

A more specific feature of my invention is a selective control arrangement for a pulse train responsive sequence relay circuit wherein the sequence relays are arranged in a plurality of sequence relay groups and each sequence relay may be locked operated over a holding circuit discrete to the sequence relay group of which it is a part.

More specifically, in accordance with a feature of my invention, a selecting circuit selectively operates a sequence relay in any or all of a plurality of sequence relay groups and the operated relays are held operated over separate holding circuits each including a make contact of an operated sequence relay and beak contacts of all sequence relays which succeed the operated sequence relay in its own sequence relay group.

A particular feature of my invention is an auxiliary, pulse absorbing relay which is included in each sequence relay group. The auxiliary relays absorb those control pulses of the pulse train which, due to the initial operation of a plurality of sequence relays, are extraneous and would impair the desired sequence of control or gating operations performed by the sequence circuit.

The aforegoing and other objects and features of my invention will be more readily understood from the following description when read with reference to the drawing which depicts one illustrative embodiment of my invention in which a relay type sequence circuit 100 provides selective sequential access from a signal transmitting circuit 108 to an information storage circuit 107.

Although the illustrative embodiment of my invention, as described below, utilizes a relay type sequence circuit to provide selective sequential access to digital stored information, it is to be understood that the principles set forth herein are equally applicable to other types of logic circuits which provide selective access to multibit stored data. Further, it is to be understood that a sequence circuit organized in accordance with the principles described herein may be readily utilized for functions other than providing selective access to stored information.

The drawing depicts in schematic form one illustrative embodiment of my invention wherein a signal transmitting circuit 108 is given selectively controllable sequence access to the discrete digits D1–DN of the information stored in information storage circuit 107. Access to each digit D1–DN is provided through make contacts C1(4)–CN(4) of the steering relays C1–CN in relay sequence circuit 100.

Information storage circuit 107 may comprise any well-known register circuit for storing digital information and will be referred to herein as register 107. Signal transmitting circuit 108 may comprise any of the well-known circuits which convert sequentially received bits of information into coded signals and transmit the signals to a remote location. Signal transmitting circuit 108 will be referred to herein as transmitter 108. Examples of circuits similar to register 107 and transmitter 108 are disclosed in the aforenoted McKim et al. patent. Since the details of register 107 and transmitter 108 are not necessary for an understanding of my invention and circuits of this type are well known in the art, no detailed description thereof is included herein.

The detached contact method of illustration has been adopted in the drawing. In this method, the relay winding is shown physically separated from the contacts controlled thereby. This permits placement of the relay contacts at locations in the circuit drawing where the functions performed thereby are visually pertinent, and avoids the necessity of employing a large number of unnecessarily long connecting lines. In this system of illustration, break contacts are illustrated by a short line perpendicular to the conductor to which they are connected, and make contacts are illustrated by a pair of diagonal lines forming an "X," which intersect the conductor to which they are connected. Relay contacts are identified by a designation corresponding to that of the relay winding by which they are controlled. For example, a plurality of break contacts C1(5)–C5(5) are shown horizontally disposed along conductor 111 in the drawing. Each of these contacts is controlled by the correspondingly designated relay C1–C5, respectively. In addition to the relay designation, the contacts controlled thereby are numerically designated with a digit enclosed in parentheses. For example, contact CON(1) is one relay contact controlled by relay CON and contact CON(2) is another relay contact controlled by relay CON. Although separately designated, when make and break contacts of the same relay are connected to interconnected conductors, they may be considered herein as transfer type relay contacts. For example, make contact C1(2) and break contact C1(5) are transfer contacts controlled by relay C1.

Ground supply relay GS supplies operating potential 104 and holding potential 105, 106 to sequence circuit 100 through its make contacts GS(1), GS(2) and GS(3), respectively. Relay GS is operated and its contacts GS(1)–GS(3) are closed when the services of sequence circuit 100 are required. The detailed circuit for energizing relay GS is not necessary for an understanding of my invention and therefore is not shown in detail in the drawing. However, a switch S4 is shown to illustrate any manually or automatically controlled means for operating and releasing relay GS.

Selectors S1 and S2 provide selectable initial operating circuits for the steering relay C1–CN. Selector S1 may comprise any manually or automatically controlled means S1(1), S1(2), S1(3) for momentarily connecting a selected one of the conductors L1, L2 and L3 to operating potential 109. Selector S2 may comprise any manually or automatically controlled means S2(4), S2(5), S2(6)–S2(N) for momentarily connecting a selected one of the conductors L4, L5, L6–LN to operating potential 110.

Switch S3 may comprise any manually or automatically controlled means for enabling the operating circuit of relay CON. The pulse train of control signals to which sequence circuit 100 responds is generated by the alternate operating and releasing of relay CON through switch S3 under the control of interrupter 101. Operating potential 104 is applied to conductor 111 through make contacts GS(1) and CON(1) when relays CON and GS are operated. Operating potential 104 is removed from conductor 111 at make contact CON(1) when relay CON is released.

It is assumed, for purposes of this description, that sequential access from transmitter 108 through sequence circuit 100 is to be provided to digits D2, D3, D5, D6 and DN of the information stored in register 107. Access must therefore be denied to digits D1 and D4.

Each digit D1–DN of the stored information is discretely associated with its correspondingly numbered steering relay C1–CN of sequence circuit 100. Steering relays C1–CN are divided into two relay groups 150 and 151. Relay group 150 comprises steering relays C1, C2 and C3 and an auxiliary relay A, whose function is described later herein. Relay group 151 comprises steering relays C4, C5, and C6 through CN.

Since digit D2 is the first nondeleted digit of stored information which is associated with a steering relay in the first relay group 150, selector S1 is controlled to momentarily connect operating potential 109 through switch S1(2) to conductor L2. An operating circuit is thereby provided for steering relay C2. Since digit D5 is the first nondeleted digit of stored information which is associated with a steering relay in the second relay group 151, selector S2 is controlled to momentarily connect operating potential 110 through switch S2(5) to conductor L5. An operating circuit is thereby provided for steering relay C5.

Steering relay C2 is held operated over its primary holding circuit extending from negative potential through its control winding, its make contact C2(1), break contacts of all succeeding relays in relay group 150, e.g., C3(7)–A(7), and make contact GS(2) to holding potential 105. Steering relay C5 is held operated over its primary holding circuit extending from negative potential through its control winding, its make contact C5(1), break contacts of all succeeding relays in relay group 151, e.g., C6(7)–CN(7), and make contact GS(3) to holding potential 106. In accordance with an aspect of my invention, the provision of separate holding circuits for relay groups 150 and 151 permits a steering relay in the second relay group 151 of sequence circuit 100 to be initially operated and held operated regardless of the operative condition of relays in the preceding relay group 150 of sequence circuit 100.

Make contacts C1(4)–CN(4) serve as gate through which the digit D1–DN respectively are transferred to transmitting circuit 108 from register 107. When steering relays C2 and C5 are operated as above, access from transmitting circuit 108 to digit D2 in register 107 is provided through break contact C1(9) and make contact C2(4). However, access to digit D5 through make contact C5(4) is not yet provided, since that access path is opened at break contact C2(9).

When switch S3 is closed, relay CON is alternately operated and released under the control of interrupter 101, and a pulse train of control signals is generated, as described above. The first control signal of the pulse train is applied to conductor 111 following the above-described initial operation of relays C2, C5 and GS.

The first energizing of relay CON through interrupter 101 initiates application of operating potential 104 to steering relay C3 over an operating circuit extending through make contacts GS(1) and CON(1), break contact C1(5), make contact C2(2), break contact C3(6) and the control winding of relay C3 to negative potential. Steering relay C3 is operated over this circuit. At this time, the operating circuit for steering relay C3 is opened at break contact C3(6). However, steering relay C3 is held operated over its primary holding circuit extending from negative potential through its control winding, its make contact C3(1), break contact A(7) and make contact GS(2) to holding potential 105. Further, when relay C3 operated, the above-described primary holding circuit for steering relay C2 was opened at break contact C3(7). However, relay C2 remains operated, under the control of relay CON, over its secondary holding circuit extending from negative potential through the control winding of relay C2, its make contact C2(1) and make contacts C3(3), CON(2) and GS(2) to holding potential 105.

The first control signal of the pulse train is ended when relay CON is released under the control of interrupter 101. When relay CON releases, the above-described secondary holding circuit for steering relay C2 is opened at make contact CON(2) and steering relay C2 is released.

When steering relay C2 releases, the digit D2 access path is opened at make contact C2(4), and the digit D3 access path including the now closed make contact C3(4) is completed at break contact C2(9). Access is thus provided from transmitter 108 to digit D3 of the information stored in register 107.

When relay CON is next operated under the control of interrupter 101, a second control signal in the form of a pulse of operating potential 104 is generated. The second control signal operates auxiliary relay A over a circuit extending from operating potential 104 through make contacts GS(1) and CON(1), break contacts C1(5) and C2(5), make contact C3(2), break contact A(6) and the control winding of auxiliary relay A to negative potential. At this time the operating circuit for relay A is opened at break contact A(6). However, auxiliary relay A is held operated over its primary holding circuit extending from negative potential through its winding, its make contact A(1) and make contact GS(2) to holding potential 105.

When relay A operated, the above-described primary holding circuit for steering relay C3 was opened at break contact A(7). However, relay C3 is held operated over its secondary holding circuit, extending from negative potential through its control winding, its make contact C3(1), and make contacts A(3), CON(2) and GS(2) to holding potential 105.

The release of relay CON by interrupter 101 ends the second control signal. When relay CON releases, the secondary holding circuit for steering relay C3 is opened at make contact CON(2) and steering relay C3 is released.

The release of relay C3 opens the digit D3 access path from transmitter 108 to register 107 at make contact C3(4). It will be recalled that steering relay C5 was initially operated and held operated over its primary holding circuit to holding potential 106 and its make contact C5(4) therefore is closed. Steering relay C4 was not operated, and its break contact C4(9) therefore is closed. Therefore, when relay C3 is released, the digit D5 access path is completed through break contact C3(9), break contact C4(9) and make contact C5(4).

Since steering relay C5 was initially operated, it was not necessary to provide a control signal to initiate the operation thereof. However, a control signal was automatically generated subsequent to the operation of steering relay C3. Some disposition of this extraneous control signal must be made in order to maintain the proper sequence of operation of the steering relays in sequence circuit 100. Auxiliary relay A is provided to absorb the extraneous control signal. Auxiliary relay A has no digit access gating contacts associated with the access paths between the transmitter 108 and register 107. Therefore there is no digital access path enabled in response to the operation of auxiliary relay A. During the control signal cycle to which relay A responds, access from transmitter 108 to register 107 is provided over the access path associated with the initially energized steering relay in the second relay group 151 which, under the above assumptions, is steering relay C5. Thus, in accordance with an aspect of my invention, the auxiliary relay A absorbs the extraneous control signal and allows acces to the first nondeleted digit D5 of stored information associated with a steering relay in the second relay group 151.

The third control signal is generated when relay CON is operated for a third time by interrupter 101. When relay CON is operated, the operating circuit for steering relay C6 is completed. It extends from operating potential 104 through make contacts GS(1) and CON(1), break contacts C1(5), C2(5), C3(5) and C4(5), make contact C5(2), break contact C6(6) and the control winding of steering relay C6 to negative potential.

The operation of relay C6 opens its operating circuit at break contact C6(6). However, steering relay C6 is held operated over its primary holding circuit extending from negative potential through its control winding, its make contact C6(1), break contact CN(7) and make contact GS(3) to holding potential 106.

When relay C6 operated, the aforedescribed primary holding circuit for steering relay C5 was opened at break contact C6(7). However, relay C5 is held operated over its secondary holding circuit extending from negative potential through its control winding, its make contact C5(1) and make contacts C6(3), CON(3) and GS(3) to holding potential 106.

The third control signal is ended when relay CON is again released by interrupter 101. When relay CON releases, the secondary holding circuit of steering relay C5 is opened at make contact CON(3), and steering relay C5 is released.

When steering relay C5 releases, the digit D5 access path from transmitter 108 to register 107 is opened at make contact C5(4). At this time, the digit D6 access path, including make contact C6(4), is closed at break contact C5(9). Transfer of digit D6 from register 107 to transmitter 108 is thus accomplished.

The fourth control signal is generated when relay CON is again operated through interrupter 101. In response to the fourth control signal, the steering relay which next succeeds steering relay C6 in relay group 151 will be operated. In this embodiment, relay CN is shown as the last steering relay of relay group 151. The make contact CN–1(2) of steering relay CN–1 is shown on the drawing, however, the control winding of this relay is not shown. Steering relay CN–1 represents the penultimate steering relay of the sequence circuit 100.

The last steering relay CN of sequence circuit 100 is operated over a circuit extending from operating potential 104 through make contacts GS(1) and CON(1), break contacts C1(5), C2(5), C3(5), C4(5) and C5(5), make contact CN–1(2) of the penultimate steering relay (not shown, break contact CN(6) and the winding of steering relay CN to negative potential. If, as in the embodiment illustrated by the drawing, relay C6 is the penultimate relay of sequence circuit 100, make contact CN–1(2) is equivalent to a make contact C6(2) (not shown) of penultimate steering relay C6. Steering relay CN is operated over the above circuit.

When relay CN operates, its operating circuit is opened at break contact CN(6). However relay CN is held operated over its primary holding circuit extending from negative potential through its control winding, its make contact CN(1) and make contact GS(3) to holding potential 106.

When relay CN operated, the primary holding circuit for relay C6 was opened at contact CN(7). However, relay C6 is held operated over its secondary holding circuit exending from negative potential through its winding, through its make contact C6(1) and make contacts CN(3), CON(3) and GS(3) to holding potential 106.

The fourth control signal ends when relay CON is again released by interrupter 101. When relay CON releases, the secondary holding circuit for steering relay C6 is opened at make contact CON(3), and relay C6 is released. The release of relay C6 opens the digit D6 access path at make contact C6(4) and completes the digit DN access path, including make contact CN(4), at break contact C6(9), thus supplying digit DN to transmitter 108.

The receipt of the last digit DN of the stored information D1–DN by transmitter 108 represents the completion of the selective access control operation of sequence circuit 100. At this time switch S3 is opened, thus preventing the generation of any further control signals by relay CON, and relay GS is released to remove energizing potential 104 and holding potential 105, 106 from sequence circuit 100. The release of relay GS opens the primary holding circuit of auxiliary relay A at make contact GS(2) and the primary holding circuit for steering relay CN at make contact GS(3). Auxiliary relay A and steering relay CN are thus released, and sequence circuit 100 is prepared for subsequent use.

Had it been assumed in the above description that all digits D1–DN of the information stored in register 107 were to be transmitted by transmitter 108 and that no digits D1–DN were to be deleted, steering relay C1 of relay group 150 would have been initially energized through selector S1, and steering relay C4 of relay group 151 would have been initially energized through selector S2. Under these conditions, sequence circuit 100 would have functioned exactly as described above except that control signals would have been sequentially applied to relays C2, C3, A, C5, C6 and CN respectively, thereby providing sequential access from transmitter 108 to all the digits D1–DN of the information stored in register 107.

If it is desired to delete more than a single digit from either relay group 150 or 151 or from both groups, the appropriate steering relays may be selectively operated through selectors S1 and S2. For example, if it is desired to delete digits D1 and D2, steering relay C3 may be initially operated through selector S1. Similarly, if digits D4 and D5 must be deleted, steering relay C6 may be initially operated through selector S2.

Additional relay groups similar to relay group 150 may be added to sequence circuit 100 to provide various other selective access combinations. The only criteria for digit deletions is that the digits to be deleted are associated with the first relays in each respective relay group. Thus, the selective initial operation of one relay in each group causes all relays preceding the initially operated relay in each respective group to be bypassed.

It is to be understood that the above-described arrangements are illustrative of an application of the principles of my invention. Numerous other arrangements may be devised by those skilled in the art without departing from the spirit and scope of my invention; for example, arrangements utilizing different circuit devices and performing different sequential control functions.

What is claimed is:

1. A sequence circuit comprising means for generating a train of energizing potential pulses;

a first chain of sequence control means each energized responsive to application of energizing potential thereto and held energized responsive to application of holding potential thereto;

energizing circuit means controlled by each energized one of said first chain sequence control means for applying the next succeeding one of said pulses in said train only to the next succeeding one of said first chain sequence control means;

first holding circuit means controlled by each energized one of said first chain sequence control means for applying holding potential to said energized one of said first chain sequence control means;

first release circuit means controlled by each energized one of said first chain sequence control means and by said pulse generating means for removing said applied holding potential from the next preceding one of said first chain sequence control means;

a second chain of sequence control means each energized responsive to application of energizing potential thereto and held energized responsive to application of holding potential thereto;

said energizing circuit means controlled by each energized one of said second chain sequence control means when said holding and energizing potentials are removed from all but the last one of said first chain sequence control means for applying the next succeeding one of said pulses in said train only to the next succeeding one of said second chain sequence control means;

second holding circuit means controlled by each energized one of said second chain sequence control means for applying holding potential to said energized one of said second chain sequence control means;

and second release circuit means controlled by each energized one of said second chain sequence control means and by said pulse generating means for removing said applied holding potential from the next preceding one of said second chain sequence control means.

2. A sequence circuit according to claim 1 further comprising selection means for applying a pulse of energizing potential to a selected one of said first chain sequence control means and to a selected one of said second chain sequence control means.

3. A sequence circuit according to claim 2 wherein said selection means comprises means for applying a pulse of energizing potential to a selected one of said first chain sequence control means;

and means for applying a pulse of energizing potential to a selected one of said second chain sequence control means.

4. A sequence circuit comprising a first chain of sequence control means;

a second chain of sequence control means;

selecting means comprising means for energizing and holding energized a selected first chain sequence control means and means for energizing and holding energized a selected second chain of sequence control means;

means for generating a series of control signals which energize those of said sequence control means to which said control signals are applied;

means controlled by each of said first chain sequence control means for applying said control signals sequentially to those first chain sequence control means which succeed said selected first chain sequence control means in said first chain;

control signal absorbing means;

means controlled by the last sequence control means in said first chain responsive to said application of a control signal to said last sequence control means in said first chain for applying the next control signal in said series of control signals to said control signal absorbing means;

and means controlled by each of said first and second chain sequence control means for applying the control signals succeeding said next control signal in said series of control signals sequentially to those second chain sequence control means which succeed said selected second chain sequence control means in said second chain.

5. A sequence circuit in accordance with claim 4 wherein said selecting means comprises means for applying a pulse of energizing potential to said selected first chain sequence control means;

means for applying a pulse of energizing potential to said selected second chain sequence control means;

means controlled by said selected first chain sequence control means, by all said first chain sequence control means which succeed said selected first chain sequence control means in said first chain, and by said pulse absorbing means for applying holding potential to said selected first chain sequence control means;

and means controlled by said selected second chain sequence control means and by all said second chain sequence control means which succeed said selected second chain sequence control means in said second chain for applying holding potential to said selected second chain sequence control means.

6. A relay sequence circuit comprising a first relay chain including a plurality of sequence relays succeeded by an auxiliary relay;

a second relay chain including a plurality of sequence relays;

a primary holding circuit for each of said first chain relays which includes a break contact of all succeeding relays in said first relay chain;

a secondary holding circuit for each of said first chain relays which includes a make contact of the next succeeding relay in said first relay chain;

a primary holding circuit for each of said second chain relays which includes a break contact of all succeeding relays in said second relay chain;

a secondary holding circuit for each of said second chain relays which includes a make contact of the next succeeding relay in said second relay chain;

means for applying a relay operating pulse to a selected first chain sequence relay;

means for applying a relay operating pulse to a selected second chain relay;

and means for applying relay operating pulses of a pulse train sequentially to said first chain relay which succeed said selected first chain sequence relay in said first relay chain and, subsequently, to said second chain relays which succeed said selected second chain relay in said second relay chain.

7. A relay sequence circuit in accordance with claim 6 wherein said last mentioned pulse applying means comprises a control relay periodically energizable to generate said train of relay energizing pulses;

and wherein both of said secondary holding circuits further include a make contact of said control relay.

8. A relay chain circuit comprising a plurality of sequentially designated chain relays arranged in a first group and a second group;

a control relay;

an auxiliary relay;

chain relay operating circuit means for each said chain relay for selectively operating said chain relays;

other chain relay operating circuit means for each said chain relay excepting the first chain relay of said first group and the first chain relay of said second group serially including a make contact of the next preceding chain relay, a break contact of all other preceding chain relays and a make contact of said control relay;

auxiliary relay operating circuit means serially including a break contact thereof, a make contact of the last chain relay of said first group, a break contact of all other chain relays of said first group and a make contact of said control relay;

locking circuit means for each said chain relay of said first group serially including a break contact of all succeeding chain relays of said first group and a make contact of said auxiliary relay;

locking circuit means for each of said chain relay of said second group serially including a break contact of all succeeding chain relays of said second group;

locking circuit means for each said chain relay excepting said last chain relay of said first group and the last chain relay of said second group serially including a make contact of the next succeeding chain relay and a break contact of said control relay;

locking circuit means for said last chain relay of said first group serially including a make contact of said auxiliary relay and a make contact of said control relay;

and locking circuit means for said auxiliary relay serially including a make contact of said auxiliary relay.

9. In an information retrieval circuit including information storing means having multibit information stored therein and individual gating means discretely associated with each bit of said stored information; a sequence circuit comprising sequence control means discretely associated with each of said gating means for controlling said discretely associated gating means;

said sequence control means arranged in a first chain and a second chain;

selecting means comprising means for energizing and holding energized a selected first chain sequence control means and means for energizing and holding energized a selected second chain sequence control means;

means for generating a series of control signals for energizing those sequence control means to which said control signals are applied;

means controlled by each of said first chain sequence control means for applying said control signals sequentially to those first chain sequence control means which succeed said selected first chain sequence control means in said first chain;

control signal absorbing means;

means controlled by the last sequence control means in said first chain responsive to application of a control signal to said last sequence control means in said first chain for applying the next control signal in said series of control signals to said control signal absorbing means;

and means controlled by each of said first and second chain sequence control means for applying the control signals succeeding said next control signal in said series of control signals sequentially to those second chain sequence control means which succeed said selected second chain sequence control means in said second chain.

10. In an information retrieval circuit including a plurality of digit registers, a transmitting circuit, a relay chain comprising a plurality of sequentially designated chain relays each discretely associated with one of said digit registers, and access circuit means for each of said digit register means for connecting said digit register means to said transmitting means serially including a make contact of the chain relay which is discretely associated with said digit register means and break contacts of all said chain relays which precede said discretely associated chain relay in said relay chain;

a relay chain control arrangement wherein said chain relays are arranged in a first relay group and a second relay group and comprising a control relay;

an auxiliary relay;

chain relay operating circuit means for each said chain relay for selectively operating said chain relays;

other chain relay energizing circuit means for each said chain relay, excepting the first chain relay of said first group and the first chain relay of said second group, serially including a make contact of the next preceding chain relay, a break contact of all other preceding chain relays and a make contact of said control relay;

auxiliary relay energizing circuit means serially including a break contact thereof, a make contact of the last chain relay of said first group, a break contact of all other chain relays of said first group and a make contact of said control relay;

locking circuit means for each said chain relay of said first group serially including a break contact of all succeeding chain relays of said first group and a break contact of said auxiliary relay;

locking circuit means for each said chain relay of said second group serially including a break contact of all succeeding chain relays of said second group;

locking circuit means for each said chain relay, excepting said last chain relay of said first group and the last chain relay of said second group, serially including a make contact of the next succeeding chain relay and a make contact of said control relay;

locking circuit means for said last chain relay of said first group serially including a make contact of said auxiliary relay and a make contact of said control relay;

and locking circuit means for said auxiliary relay serially including a make contact thereof.

No references cited.

ROBERT C. BAILEY, *Primary Examiner.*

R. B. ZACHE, *Assistant Examiner.*